United States Patent Office 3,432,463
Patented Mar. 11, 1969

3,432,463
ROOM TEMPERATURE VULCANIZABLE ORGANO-POLYSILOXANE ELASTOMER STOCKS
Paul Hittmair, Ernst Wohlfarth, and Siegfried Nitsche, Burghausen, Upper Bavaria, and Manfred Wick, Munich, Germany, assignors to Wacker-Chemie G.m.b.H., Munich, Germany
No Drawing. Filed Sept. 22, 1967, Ser. No. 669,675
Claims priority, application Germany, Sept. 26, 1966, W 42,471
U.S. Cl. 260—46.5                    5 Claims
Int. Cl. C08g 47/06, 31/09

ABSTRACT OF THE DISCLOSURE

A one-component room temperature vulcanizable silicone rubber stock based on an essentially linear diorganosiloxane polymer having at least one potentially reactive site on each terminal silicon atom admixed with an aluminum alcoholate.

Background of invention

This invention is directed to a novel one-component, low temperature vulcanizing silicone rubber stock.

The development of room temperature or low temperature vulcanizable silicone rubber stocks (generally referred to as RTV silicone rubber stocks) has resulted in production of the so-called "two component systems", which are packaged as two masses, mixed just prior to use and cure spontaneously upon mixing and the so-called "one component system" wherein all of the required ingredients or reactants are packaged in a single container and the vulcanization or cure begins when the mass is exposed to the action of water vapor or oxygen in the air. The present invention falls within the area of the one-component RTV silicone rubber system. It relates to a novel one-component RTV silicone rubber system which can be stored for an almost indefinite period of time in the substantial absence of water and will cure or vulcanize to an excellent elastomeric product upon exposure to water in any form.

The heretofore known one-component RTV silicone rubber stocks are based on diorganopolysiloxanes having one potentially reactive substituent bonded to each terminal silicon atom. The reactive substituent bonded to the terminal silicon atom is usually a hydroxyl group and the siloxane polymers are described as α,ω-dihydroxy-diorganopolysiloxanes. However, in addition to the hydroxyl group, the reactive group on the terminal silicon atoms can be alkoxy and/or acyloxy groups among others. This base siloxane polymer is essentially difunctional having a functional group on each terminal silicon atom and is admixed with a cross-linking silicon compound which is tri- tetra- or polyfunctional such as tri- and tetraacyloxysilanes, aminosilanes and oxime silanes.

It is apparent these unique RTV silicone rubber systems have been amazingly successful in the market place but these materials are not without fault and serious inadequacies. Thus, the cure of the one-component RTV may be accompanied by the release of materials which are objectionable because they are malodorous, corrosive or physiologically noxious. Further, the commercialization of several RTV silicone rubber systems has been slow because of the expense involved in preparation thereof. Further, the cure or vulcanization of deep sections of the heretofore known one-component RTV silicone rubber systems has been generally unsatisfactory because the surface of the exposed mixture would cure rapidly to form a skin which inhibited the passage of water vapor to the underlying portion of the mixture and the cure would proceed very slowly or would cease altogether.

The object of this invention and the advantages achieved hereby is the avoidance or substantial reduction in each and every one of the difficulties and inadequacies encountered with the previously known one-component RTV silicone rubber stocks as described above. A further object is the introduction of a novel and useful one-component RTV silicone rubber system. Other objects and advantages of this invention are detailed in or will be apparent from the disclosure and claims following.

The invention

This invention is a one-component, room temperature vulcanizable silicone rubber stock which is storable under substantial exclusion of moisture and cures upon exposure to water consisting essentially of (1) an essentially linear diorganosiloxane polymer having a reactive substituent selected from amino and acyloxy radicals bonded to each terminal silicon atom and (2) an aluminum alcoholate as cross-linking agent.

The organosiloxane polymers employed as basic ingredient (1) herein can be defined by the general formula $AR_2SiO[R_2SiO]_xSiR_2A$ wherein each R is a monovalent hydrocarbon, halogenohydrocarbon or cyanoalkyl radical, each A is an acyloxy or amino radical and $x$ is an integer, preferably not exceeding 5,000. These polymers are readily prepared by known methods from the hydroxyl endblocked diorganosiloxane polymers described in the literature in such U.S. patents as No. 2,843,555, No. 3,070,566 and No. 3,127,363.

The organic substituents along the siloxane chain are monovalent hydrocarbon radicals including alkyl radicals such as methyl, ethyl, n-propyl, isopropyl, dodecyl and octadecyl radicals; alkenyl radicals, such as vinyl, allyl and hexenyl radicals; cycloalkyl radicals and cycloalkenyl radicals such as cyclopentyl and cyclohexenyl radicals; aryl radicals such as phenyl, xenyl, naphthyl, and phenanthryl radicals; aralkyl radicals such as benzyl, beta-phenylethyl and xylyl radicals as well as alkaryl radicals such as tolyl radicals.

The preferred substituted hydrocarbon radicals are those hydrocarbon radicals carrying halogen atoms and cyanoalkyl radicals. Examples for such R radicals are trifluorovinyl and 3,3,3-trifluoropropyl radicals, ortho-, para-, and meta-chlorophenyl, ortho-, para-, and meta-bromophenyl radicals, the alpha,alpha,alpha-trifluorotolyl-, beta-cyanoethyl- and gamma-cyanopropyl-, omega-cyano-n-butyl-, beta-cyano-n-propyl- and omega-cyano-octadecyl radicals.

Expediently, the R radicals always contain not more than 19 carbon atoms, especially not more than 8 carbon atoms; preferably the R radicals are not double bonded. The R radicals which are bonded to a silicon atom may be alike or different.

The preferred R radical in the terminal units of the formula —OSiR$_2$A is the methyl radical.

The acyloxy groups A can be defined by the general formula

wherein R' is hydrogen or a monovalent hydrocarbon, halogenohydrocarbon or cyanoalkyl radical. The above enumerated examples for the R radicals are at the same time examples for the radicals represented by R'. The preferred acyloxy A groups are those wherein R' in the acyl radical is hydrogen or a hydrocarbon radical free of aliphatic unsaturation with 1 to 18 carbon atoms. Examples of such acyloxy radicals are the formyl-, acetyl-, propionyl-, butyryl-, isovaleroyl-, hexoyl-, 2-ethylhexoyl-, stearoyl-, benzoyl-, and p-tolylcarboxy radicals. Especially preferred as the R' radical is the methyl radical.

The amino A group is defined by the general formula $NH_pR''_{2-p}$ wherein every R'' is a hydrocarbon radical and $p$ is 1 or 2. Preferably, $p$ has a value of 1. Examples for hydrocarbon R radicals are also true for hydrocarbon R'' radicals with the exception of the vinyl radical. Other examples for hydrocarbon R'' radicals are the n-butyl-, tertiary-butyl, 3,5,5-trimethylcyclohexyl and 2,3,3-triethylcyclohexyl radical. Preferably, the R'' radicals contain not more than 19 carbon atoms, especially not more than 12 carbon atoms. The preferred R'' radicals are the n-butyl and the cyclohexyl radical. If desired the diorganopolysiloxane used in the present discovery can also contain Si-bonded hydroxyl groups in addition to the acyloxy or amino group. It is expedient, however, to avoid the presence of hydroxyl groups.

The preparation of the diorganopolysiloxanes which are used for the present discovery is not novel and is well documented in the literature. Excellent yields are obtained by reacting (a) α,ω-dihydroxydiorganopolysiloxane [e.g. $HOR_2SiO[R_2SiO]_xSiR_2OH$] with (b) diacyloxysilane

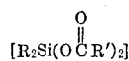

or (c) amino substituted silane $[R_2Si-(NH_pR''_{2-p})_2]$. These silanes are well known in the art and are readily prepared by known methods.

The diorganopolysiloxanes having one hydroxyl group in every terminal unit used for the preparation of the diorganopolysiloxanes of the present discovery may be the same as those which are ordinarily used for the preparation of one-component systems. The diorganopolysiloxanes containing one hydroxyl group in each terminal unit can be defined by the general formula

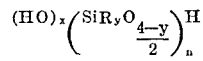

In this formula R is as above defined, $x$ is an average of 0.99 to 1.01, $y$ is an average of 1.99 to 2.01, the sum of $x+y$ is 3 and $n$ is a whole number with the value of at least 3, preferably at least 50.

As is shown by the average value of 1.99 to 2.01 for $y$, other siloxane units with other degrees of substitution can be present in small quantities, aside from the diorganosiloxane units.

Preferably at least 50 mol percent of the R radicals are aliphatic hydrocarbon radicals with not more than 4 carbon atoms especially methyl radicals. The remaining R radicals which can be present are preferably ethyl and phenyl radicals and/or vinyl radicals. If cyanoalkyl radicals are present, they are bonded to at least one mol percent of the Si atoms in the diorganopolysiloxane. For the rest, all of the specification including the enumeration of the individual radicals as examples for R which were given above in connection with the diorganopolysiloxane radicals having R groups in the terminal units are true without exception also for the R radicals in the diorganopolysiloxanes in the above formulae as well as for the R radicals in the acyloxy silanes (b) of the general formula

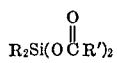

and in the aminosilane of the general formula $$R_2Si(NH_pR''_{2-p})_2$$

The diorganopolysiloxanes (a) can be homopolymers, mixtures of various homopolymers, copolymers or mixtures of various copolymers, always with the same degree of polymerization which always indicates equal values for $n$, or a mixture of the same or different homopolymers of copolymers of different degrees of polymerization.

The viscosity of the diorganopolysiloxanes (a) is expediently between 500 to 5,000,000 cs. at 25° C., preferably it is 1,000 to 100,000 cs. at 25° C.

All specifications which were made above in connection with the R' radicals in the terminal A groups of the diorganopolysiloxanes are also true without exception for the R' radicals in the acyloxy silanes (b).

The acyloxy silanes (b) can be prepared in the known manner, for example from silanes of the general formula $R_2SiCl_2$, wherein R is as above defined, by reacting with the organic acids corresponding with the desired acyloxy radicals, their anhydrides are alkali metal salts.

Various diorganodiacyloxy silanes (b) can be used.

Instead of the diorganodiacyloxy silanes, organosilanes of the general formula

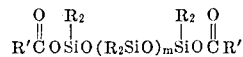

wherein R and R' are as above defined and $m$ equals 0 or a whole number of 1 to 5, may be used if desired.

The basic compounds, that is ammonia, primary or secondary amines, from which the amino substituted organic silicon compounds (c) can be prepared can be represented by the general formula $NH_{p+1}R''_{2-p}$, wherein $p$ and R'' are as above defined. All the definitions which were given together in connection with the R' radicals in the terminal A groups of the diorganopolysiloxane are also true without exception for the R'' radicals in this formula. Because of the ready availability chlorine is preferred as a halogen atom in the silanes of the general formula $R_2SiX_2$.

The reaction of the silanes of the general formula $R_2SiX_2$ with ammonia, primary or secondary amines to the amino substituted silicon compounds (c) can take place according to procedures known for reactions of this kind. Such procedures are known, for instance, from U.S. Patents 2,564,674, 2,579,417 and 2,579,418. Here enough ammonia or amine is used that all halogen atoms of the halogen silane are replaced by amino groups. The reaction takes place by mixing the reaction components; it is carried out preferably at the lowest possible temperature, that is a temperature in the range of that at which the reaction mixture is not yet solid and room temperature, preferably at −10° to +10° C. in order to keep the formation of polymeric silazanes as low as possible and to produce the largest possible quantity of monomeric amino silanes represented as "silamine" of the general formula $R_2Si(NH_pR''_{2-p})_2$, wherein R, R'' and $p$ are as defined above. However, polymeric products can also be used which can appear during the reaction of halogen silanes of the general formula $R_2SiX_2$ with ammonia or primary amines. It is also not necessary to remove the monomeric amino silanes obtained from the above reaction from the polymeric silazanes which may be obtained at the same time. The preparation of the amino substituted organic silicon compounds (c) is expediently carried out with the exclusion of water and in the presence of a solvent which is inert toward the reaction component, such as toluene or methylene chloride. After the reaction is completed, that is after no more amine salt precipitates, it is filtered off from the amine or ammonia salt and the solvent which can be used at the same time is distilled off at the lowest possible temperature, that is under reduced pressure. The residue of this distillation after filtering off the solids is suitable as amino substituted organosilicon compounds (c).

Mixtures of various compounds (c) can be used.

Preferably, the acyloxy silanes (b) or the amino substituted organic silicon compounds (c) are incorporated during the preparation of the diorganopolysiloxanes of the present discovery, so that there are 1 to 20 gram equivalents of silicon atoms of the acyloxy silanes (b) or the amino substituted organic silicon compounds (c) per gram equivalents hydroxyl group in the diorganopolysiloxane (a). This corresponds primarily to 0.1 to 10 percent by weight, especially 2 to 7 percent by weight always calculated on the weight of the diorganopolysiloxane (a). An excess of compound (b) or (c) may then remain in the diorganopolysiloxanes used in the present discovery.

The reaction of the diorganopolysiloxanes (a) containing 1 hydroxyl group in each terminal unit with the acyloxy silanes (b) or the amino substituted organic silicon compounds (c) takes place while mixing the materials (a) and (b) or (a) and (c) at room temperature, that is at 18 to 25° C., and at normal pressure, that is at about 760 mm. Hg abs. If desired, higher or lower temperatures and/or higher or lower pressures can be used. The reaction requires about 10 minutes to 5 days; it can be accelerated by heating. To achieve a maximum complete reaction and therewith a longer term until a skin is formed in the air of the completed material, it is expedient to allow the reaction to run for at least 20 hours before the aluminum alcoholate is added. Expediently, the admission of water is excluded especially when storing the diorganopolysiloxane used for the present discovery. The removal of the carboxylic acid and basic nitrogen compounds which are freed by the reaction is in no way necessary.

The diorganopolysiloxane used according to the present discovery, namely diorganopolysiloxane whose terminal units are of the general formula —OSiR$_2$A, wherein R and A are as above defined are mixed with the aluminum alcoholates in any desired succession at any desired temperature and any desired pressure. Preferably, the aluminum alcoholates are added to the diorganopolysiloxanes.

The aluminum alcoholates used as cross-linkers in the present discovery can be represented by the general formula Al(OR''')$_3$, wherein R''' is a monovalent aliphatic hydrocarbon radical which can contain up to three hydroxyl groups. Partial hydrolyzates of aluminum alcoholates of this formula can also be used. The R''' radicals can be alike or different. The examples for aliphatic hydrocarbon radicals R are also true for the R''' radicals. Other examples for R''' radicals are secondary butyl, tertiary butyl, n-hexyl, 2-ethylbutyl, 2-ethylhexyl, gamma-hydroxypropyl, gamma-hydroxybutyl, 2-hydroxyl-1,1,2-trimethylpropyl and 3,4-dihydroxy-1-methylbutyl radicals. Preferably, the R''' radicals have at least 3 and not more than 13 carbon atoms. Especially preferred as R''' radicals are n-propyl, isopropyl and secondary butyl radicals. The aluminum alcoholates used as cross-linkers are known compounds, many of which are available commercially. The aluminum alcoholates are preferably used in quantities of 0.5 to 25% by weight, preferably 1.5 to 20% by weight always calculated on the quantity of the diorganopolysiloxane. The more aluminum alcoholate that is used the greater will be the Shore hardness of the elastomers.

Diorganopolysiloxanes wherein A is an acyloxy group, generally can tolerate larger quantities of aluminum alcoholates than diorganopolysiloxane where A is an amino group.

If diorganopolysiloxanes are used in the method of the present discovery, wherein A is an amino group, observation must be made for a whitish-gray discoloration after the addition of the aluminum alcoholate, which will disappear, however, after extended storage or heating, for instance, to 50° to 100° C. after this addition will disappear entirely or partially. Such materials stored for an extended time or until the turbidity has disappeared completely or partially will give elastomers with a greater Shore hardness as compared to freshly prepared mixtures from diorganopolysiloxanes and aluminum alcoholates of the present discovery.

If the diorganopolysiloxanes used for the method of the present discovery are those wherein A is an acyloxy group, then material will be obtained after the addition of an aluminum alcoholate which displays an unpleasing odor of acetic esters.

The additives traditionally used in materials which were hardened to elastomers based on diorganopolysiloxanes can also be used in the method of the present discovery or mixed into the materials which are prepared according to the method of the present discovery; such additives are, for example, softeners such as fluid dimethylpolysiloxanes endblocked by trimethylsiloxy groups but especially reinforcing and/or non-reinforcing fillers. The additives should be inert toward aluminum alcoholate.

Examples of reinforcing fillers, that is for fillers with a surface of more than 50 m.$^2$/g. are silicas produced pyrogenically from the gas phase (i.e. fume silicas), silica hydrogels dehydrated while maintaining the structure, that is the so-called silica aerogels, and precipitated silicas with a large surface area. These fillers can, if desired, display organosiloxy or alkoxy groups at their surface. Examples for non-reinforcing fillers, that is fillers with a surface of less than 50 m.$^2$/g. are, for example, quartz flour diatomaceous earth, calcium carbonate and metal oxide powders such as titanium dioxide, ferric oxide and aluminum oxide with a surface of less than 50 m.$^2$/g. Fibrous fillers such as asbestos, glass fibers, and organic fibers can also be used. Mixtures of various fillers can be used. Preferably, the fillers are used in quantities of 5 to 90% by weight calculated on the total weight of organopolysiloxane and filler. The traditionally used or usable condensation catalysts in materials which will harden to elastomers at room temperature based on diorganopolysiloxanes can also be used or mixed into the materials of the present discovery. Examples of such condensation catalysts are primary, secondary and tertiary organic and silicon organic amines which possess a dissociation constant of at least $10^{-7}$ in a diluted aqueous solution at 25° C., such as di-n-butyl amine as well as salts of ammonia, the amines, quaternary ammonia hydroxides or metals of the electromotive series from lead to manganese, including those metals which contain hydrocarbon radicals on the metals and carboxylic acids or phosphoric acids or their acid esters, which contain active hydrogen atoms only in

or HOC bond. Especially suitable is dibutyltindilaurate as a condensation catalyst. Through the use of a condensation catalyst rapid hardening of the material of the present discovery and thicker layers are obtained. If some of the organic radicals in the diorganopolysiloxane used in the present discovery, for instance 0.5 to 10 mol percent of the R radicals, are radicals with aliphatic multiple bonds especially vinyl radicals, the use of organic peroxides in quantities of 0.01 to 5 percent by weight calculated on the weight of the diorganopolysiloxane is also of advantage.

The method of the present discovery can be carried out in the presence of an inert solvent or the materials of the present discovery can be dispersed or dissolved in such solvents. Examples of suitable solvents are hydrocarbon materials such as benzene, toluene, xylene and petroleum ether, halogen hydrocarbons such as methylene chloride, ethers such as dibutyl ether, or ketones such as methyl isobutylketone.

All the above materials can be used without special drying, that is in their air-dried commercial form, in the method of the present discovery and exclusively in the method of the present discovery without deleteriously affecting the storage life of the materials prepared according to the present discovery which, of course, must be stored avoiding the admission of water.

The materials prepared according to the present discovery are storable in the absence of water; they will harden at room temperature under the effect of water wherein the normal water content of the air is sufficient. In addition to the water present in the air, or instead of this, water from another source can be used, for instance tap water, water vapor, and water from crystal water containing compounds or from another hydroxy group containing a compound to harden the materials of the present discovery into elastomers. If desired, the curing can also be carried out at a higher temperature than room temperature. It will then proceed much faster.

The elastomers obtained from the materials prepared according to the present discovery will adhere firmly to a great variety of materials such as glass, porcelain, wood, plaster, concrete, stucco and mortar, metals, as well as organic and organosilicon materials.

The materials prepared according to the present discovery are therefore very suitable, for example as adhesives, sealants and putties, for adhering organopolysiloxane elastomers obtained by other means with other materials such as steel or glass to seal joints, for example in buildings, aircraft, and automotive machines, as dental closures, as pouring masses and painting lacquers. They are further suitable for all purposes in which materials which will harden to elastomers at room temperature based on diorganopolysiloxanes are ordinarily employed, for example as protective coatings, for electrical and thermal insulation, for preparing molds and impressions, for covering media of the greater variety of types, textiles, papers, and metals as well as for preparing foils, molds and laminates.

The fact that the materials prepared according to the present discovery are self-sealing elastomers indicates that in the use of these materials for sealing crevices in expansion joints, which were caused by excessive expansion, will close of themselves if the expansion is made retrogressive. Of special importance for the use of the materials prepared according to the present discovery of sealing joints is the fact that the materials will give elastomers which are softer as they are farther removed from their air-contacting surface, that is they have a smaller modulus of elasticity. The extended time for the formation of the skin improves the free-working of the surface.

In cases where it is desirable, the surface of the materials prepared according to the present discovery can be post-hardened and thereby made non-tacking by using on them a mixture of cross-linking agents and condensation catalysts as it is traditionally used in the preparation of the so-called two-component systems based on diorganopolysiloxanes, for example of polyethylsilicate or hexaethoxydisiloxane and dibutyltindilaurate, for example by brushing it on or by spraying.

Especially soft elastomers with an especially tack-free surface are obtained by the addition of an alkyl silicate or polysilicate, for example polyethylsilicate or hexaethoxy disiloxane to the materials prepared according to the present discovery. The larger the quantity of the organic silicate added to the materials of the present discovery the less likely are the materials to harden in a thicker layer and more likely are they to remain tacky. Thus, foils of such materials remain tacky at the surface facing the base while the surface facing the air will harden without tackiness.

The measures described in the following examples are always carried out at room temperature, that is at about 18° C. and at normal pressure, that is at a pressure of about 760 mm. Hg, abs., insofar as it is not otherwise stated. These examples are offered to assist in understanding the invention and do not define or restrict the invention which is disclosed in the claims.

Example 1

(a) To a solution of 41.66 g. (0.42 mole) cyclohexylamine in 1000 ml. dry toluene, which has been placed in a 4 l. flask equipped with stirrer, calcium chloride drying tube, thermometer and dropping funnel, there was added with stirring 12.9 g. (0.1 mole) dimethyldichlorosilane at −5° to +10° C. dropwise. After the chlorosilane had been added the mixture was stirred until the contents of the flask had heated up to room temperature. The mass was filtered off from the amine salt and the filtrate toluene was distilled off at 12 mm. Hg abs. employing a heating bath at a temperature of 50° to 80° C. The residue was filtered, the filtrate was a fluid identified as dimethylbis(cyclohexylamino)silane.

(b) 80 g. of a dimethylpolysiloxane having one hydroxyl group in each terminal unit having a viscosity of 16,500 cs. at 25° C. was mixed with 4 ml. of a dimethylbis(cyclohexylamine-)silane. After 5 days the dimethylpolysiloxane thus obtained, containing dimethyl-(cyclohexylamino-)siloxy units as terminal units, was mixed with 3.4 ml. aluminum trisecondary-butylate. In the air (25° C. at 65% relative atmospheric humidity) a thin skin formed on a test piece having a thickness of about 4 mm. after 3.5 hours. After 4 days in the air the test piece had hardened through to a tack free elastomer.

(c) For comparison an attempt was made to mix into 80 g. of dimethylpolysiloxane containing 1 hydroxyl group in each terminal unit without previous reaction of this polysiloxane with the dimethylbisaminosilane 3.4 ml. of aluminum trisecondary butylate. This, however, was not possible because cross-linking took place where the aluminum alcoholate came in contact with the polysiloxane.

Example 2

(a) 100 g. of a dimethylpolysiloxane having 1 hydroxyl group in each terminal unit having a viscosity of 13,000 cs. at 25° C. was mixed with dimethylbis(cyclohexylamino-)silane prepared as in Example 1(a). After 3 hours the dimethylpolysiloxane thus obtained containing dimethyl(cyclohexylamino)siloxy units as terminal units in addition to terminal units with hydroxyl groups was mixed with 6 ml. aluminum trisecondary butylate. In the air (25° C./65% relative atmospheric humidity) a thin skin is formed on a test piece about 4 mm. thick after 4 minutes.

(b) The above described procedure was repeated with the alteration that aluminum alcoholate was first mixed in after 24 hours after the addition of the dimethylbisaminosilane into the dimethylpolysiloxane. The time until a skin was formed was then 75 minutes.

Example 3

100 g. of a mixture of 100 parts by weight of a dimethylpolysiloxane having 1 hydroxyl group in each terminal unit and a viscosity of 13,000 cs. at 25° C. and 25 parts by weight of quartz flour were mixed with 5 ml. of a fluid dimethylbis-(cyclohexylamino-)silane (prepared as in Example 1(a)). After 6 days the mixture thus obtained, containing a dimethylpolysiloxane with dimethyl-(cyclohexylamino-)siloxy units as the terminal units, was mixed with 3.4 ml. aluminum trisecondary butylate. In the air (25° at 65% relative atmospheric humidity) a thin skin was formed on a test piece about 4 mm. thick after 5 hours. After 5 days in the air the test piece had hardened through to form an elastomer. The silicone rubber sheet thus obtained was cut into a number of pieces. The pieces were then placed on top of each other to form a laminate. On the following day the pieces had welded together with each other.

Example 4

100 g. of a dimethylpolysiloxane containing 1 hydroxyl group in each terminal unit having a viscosity of 20,000 cs. at 25° C. was mixed with 5 ml. of a fluid consisting essentially of dimethylbis(cyclohexylamino-)silane prepared as described in Example 1(a). After 5 days 75 g. of dimethylpolysiloxane thus obtained, containing dimethyl(cyclohexylamino-)siloxy units as terminal units were mixed with 1.5 ml. aluminum trisecondary butylate and 2 test pieces of the material were exposed to atmospheric moisture. After 4 days both test pieces were hardened to an elastomeric, very tacky gel. Then one of these test pieces was coated with a mixture of 3 parts by volume of hexaethoxydisiloxane and 1 part by volume dibutyltindilaurate after one hour the surface of one of the test pieces will become tack free, while the inside of the test piece of the same composition remains just like the uncoated piece.

Example 5

400 g. of a dimethylpolysiloxane containing one hydroxyl group in each terminal unit with 16,500 cs. at 25° C. were mixed with 20 ml. dimethyldiacetoxy silane. After 4 days the dimethylpolysiloxane thus obtained containing acetoxy-siloxy units as terminal units is mixed with 63 ml. aluminum trisecondary butylate. The material becomes turbid white and somewhat more viscous. The smell of acetic acid disappeared and the unpleasant smell of acetic acid, secondary butyl ester became perceptible. In the air (25° C. at 65% relative atmospheric humidity) a film formed on the test piece of about 4 mm. thick after 3 hours. After 4 days standing in the air the test piece had hardened through to form a tack-free elastomer.

Example 6

(a) The procedure described in Example 1(a) was repeated with the exception that instead of the 0.42 mole of cyclohexylamine, 0.42 mole of 2-ethylhexylamine was used. A fluid was obtained which consisted of dimethylbis-(2-ethylhexylamine)silane.

(b) 100 g. of a dimethylpolysiloxane containing 1 hydroxyl group in each terminal unit having a viscosity of 28,000 cs. at 25° C. was mixed with 5 ml. of the fluid dimethylbis-(2-ethylhexylamine-)silane. After 24 hours, the dimethylpolysiloxane thus obtained, containing dimethyl-(2-ethylhexylamine-)siloxy units as terminal units in addition to some terminal units with hydroxyl groups, was mixed with 5 ml. aluminum triisopropylate. In the air (25° C. at 65% relative atmospheric humidity) a thin skin formed on a test piece having a thickness of about 4 mm. after 2 hours. After 6 days standing in the air the test piece had hardened through to form an elastomer.

Example 7

Equivalent results were achieved and excellent room-temperature vulcanizing silicone rubber stocks were prepared when Example 3 was repeated employing any of the following 10,000 cs. viscosity $\alpha,\omega$-dihydroxydiorganopolysiloxanes in place of the dimethylpolysiloxane of said Example 3: 3,3,3-trifluoropropylmethylsiloxane; copolymer of 60 mol percent dimethylsiloxane and 40 mol percent phenylmethylsiloxane; 10 mol percent cyanopropylmethylsiloxane and 90 percent dimethylsiloxane; 50 mol percent dimethylsiloxane and 50 mol percent ethylphenylsiloxane units; and a copolymer of 50 mol percent dimethylsiloxane, 45 mol percent 3,3,3-trifluoropropylethylsiloxane and 5 mol percent diphenylsiloxane.

Example 8

Equivalent results were achieved when Example 7 was repeated employing in place of the dimethylbis-(cyclohexylamino)silane any one or mixture of the following employed in chemically equivalent amounts: methylphenylbis-(cyclohexylamino)silane; dimethyldiaminosilane; dimethylbis(dimethylamino)silane; dimethylbis(phenylamino)silane; methyloctylbis(octylamino)silane; octylphenylbis(methylcyclohexylamino)silane and dimethylbis(sec-butylamino)silane.

Example 9

Equivalent results were achieved when Example 1(b) was repeated employing in place of the aluminum trisecondary butylate a chemically equivalent amount of any one or mixture of the following: aluminum tripropylate; aluminum triethylate; aluminum triisopropylate; aluminum tri-n-butylate; aluminum (n-hexylate di-isopropylate);

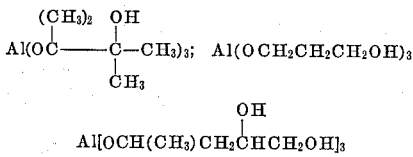

and aluminum tri-tert. butylate.

Example 10

Excellent room temperature vulcanizing silicone rubber stocks were obtained when 100 parts by weight of a siloxane polymer of the formula

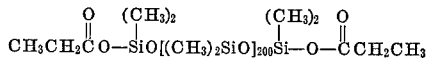

was admixed with 1.5 to 20 parts by weight of $$Al(OCH_2CH_2CH_3)_3, \ Al[OCH(CH_3)_2]_3$$
$$\text{or } Al[OCH(CH_3)CH_2CH_3]_3$$

That which is claimed is:

1. A room-temperature vulcanizing silicone rubber stock which is storable under substantial exclusion of moisture and cures upon exposure to moisture, consisting essentially of a mixture of (A) 100 parts by weight of an essentially linear diorganopolysiloxane of the general formula

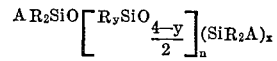

wherein each R is a monovalent hydrocarbon radical, halohydrocarbon radical or cyanoalkyl radical of less than 19 carbon atoms, y has an average value of 1.99 to 2.01, x has an average value of 0.99 to 1.01, the sum of x and y is 3 and n has a value from 50 to 5000 each, A is (1) an acyloxy radical of the formula

wherein each R' is a monovalent hydrocarbon, halogenohydrocarbon or cyanoalkyl radical of less than 19 carbon atoms or (2) an amino radical of the formula

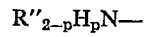

where each R'' is a monovalent hydrocarbon radical free of aliphatic unsaturation and containing less than 19 carbon atoms and p is 1 or 2 and (B) 0.5 to 25 parts by weight of an aluminum alcoholate of the general formula $Al(OR''')_3$ wherein each R''' is a monovalent aliphatic hydrocarbon radical containing up to three hydroxyl groups.

2. The silicone rubber stock of claim 1 further characterized in that it contains (D) 0.1 to 5.0 parts by weight of a condensation catalyst selected from the group consisting of primary, secondary and tertiary organic and silicon organic amines having a dissociation constant of at least $10^{-7}$ in dilute aqueous solution at 25° C. and salts of (1) ammonia, amines, quaternary ammonia hydroxides and metals of the electromotive series from lead to manganese, including those metals having hydrocarbon radicals bonded to the metal and (2) carboxylic acids, phosphoric acids and their acid esters, which contain active hydrogen atoms only in

or HOC bonds.

3. The silicone rubber stock of claim 1 further characterized in that A is an acetoxy radical, a cyclohexylamino radical or a 2-ethylhexylamino radical.

4. The silicone rubber stock of claim 1 further characterized in that each R is selected from the group consisting of methyl radicals, ethyl radicals, phenyl radicals and vinyl radicals.

5. The silicone rubber stock of claim 1 further characterized in that it contains (C) 5 to 90 percent by weight of a filler based on the total weight of organopolysiloxane (A) and filler (C) present.

References Cited

UNITED STATES PATENTS

| 2,460,799 | 2/1949 | Barry | 260—46.5 |
|---|---|---|---|
| 3,219,594 | 11/1965 | Bamford | 260—2 |

DONALD E. CZAJA, *Primary Examiner.*

M. I. MARQUIS, *Assistant Examiner.*

U.S. Cl. X.R.

260—37, 18; 117—135.1, 124, 148, 123